US007618185B2

(12) United States Patent
Hsieh

(10) Patent No.: US 7,618,185 B2
(45) Date of Patent: Nov. 17, 2009

(54) ELECTRIC MEDICAL THERMOMETER

(75) Inventor: Chih-Wei Hsieh, Chu Pei (TW)

(73) Assignee: Actherm, Inc., Hsinchu Hsien (TW)

( * ) Notice: Subject to any disclaimer, the term of this patent is extended or adjusted under 35 U.S.C. 154(b) by 99 days.

(21) Appl. No.: 11/854,553

(22) Filed: Sep. 13, 2007

(65) Prior Publication Data
US 2008/0084916 A1   Apr. 10, 2008

(30) Foreign Application Priority Data
Oct. 4, 2006  (TW) .............................. 95136852 A

(51) Int. Cl.
*G01K 7/00* (2006.01)
*G01K 11/00* (2006.01)
(52) U.S. Cl. .................. 374/163; 374/170; 374/117; 374/104; 702/130
(58) Field of Classification Search ................ 374/163, 374/170, 171, 117, 104; 702/130
See application file for complete search history.

(56) References Cited
U.S. PATENT DOCUMENTS
4,045,658 A * 8/1977 Peltola et al. ................ 702/86
5,754,452 A * 5/1998 Pupalaikis ................... 702/85

2006/0285576 A1 * 12/2006 Gyoten et al. ............... 374/178

* cited by examiner

*Primary Examiner*—Gail Verbitsky
*Assistant Examiner*—Mirellys Jagan
(74) *Attorney, Agent, or Firm*—Leong C. Lei

(57) ABSTRACT

The present invention relates to an electric medical thermometer for measuring temperature of patients in cavity. The electric medical thermometer comprises a temperature detecting set, including a temperature detecting element, for capturing temperature signals and a temperature calculating device for temperature signals processing. By combining a primary sampling frequency with a secondary sampling frequency, where the primary sampling frequency is greater than the secondary sampling frequency, the temperature calculating device translates temperature signals captured from the temperature detecting device into a temperature measurement. The underlining method of the present invention is realized by imitating the physiology of the heart beat pulse, which serves as a resource engine of thermal compensation and as an example for the sampling frequency in order to attain more precise and reliable temperature measurement. Utilizing the primary sampling frequency, the temperature calculating device will recognize the timing of temperature inflection points with temperature values. Continuing, an approximation of heart beat pulse estimated after calculation will be imposed as the secondary sampling frequency, which is then used to obtain a more precise and more reliable temperature measurement in body temperature measuring.

14 Claims, 11 Drawing Sheets

ELECTRIC MEDICAL THERMOMETER

BACKGROUND OF THE INVENTION (a) Technical Field of the Invention

The present invention pertains to an electric medical thermometer and a specific method of analyzing temperature signals integrated into the electric medical thermometer.

(b) Description of the Prior Art

At present there are various types of thermometers for measuring body temperature, of which are mainly metal-in-liquid thermometers and electric thermometers using infrared ray or heat conducting technology.

The metal-in-liquid thermometer adopts the principle that substance expands with heat and contracts with cold to measure body temperature. These kinds of thermometers are sealed and packaged in glass tubes mainly using mercury as its measuring medium. Because of the toxic nature of mercury and the fragile nature of glass tubes, mercury units are relatively unsafe. Generally, electric thermometers can be divided into two classes: infrared ray measuring and heat conducting electric thermometers. The infrared varieties make temperature measurements through the human ear within one second of contact and can store multiple temperature measurements as data. Heat conducting electric thermometers are suitable for traditional measuring performed in the mouth, in the armpit, or at the rectum to obtain body temperature readings with a permissible error not greater than 0.1° C. Electric thermometers may incorporate multiple buttons that perform tasks such as power-on/off, temperature measuring, data saving, data look-up, and so on. Temperature measuring is initiated by depressing the corresponding button. A subsequent digital signal of the temperature reading is demonstrated on a liquid crystal display.

Generally, current electric thermometers function with the purpose of analyzing temperature signals received during the measuring process to generate a measurement of body temperature.

For example, in most of current heat conducting electric thermometers, the resistance of the sensor is sensitive to temperature and the sampling period is fixed and linear during measuring body temperature. Normally, the sampling frequency of those electric thermometers in measuring process is a sole frequency of approximate one second per cycle. When the sensor reaches thermal equilibrium while measuring, a temperature measurement is therefore shown on the liquid crystal display.

In reality, human's and most mammal's temperatures stay relatively constant. In the human body, muscle tissue is responsible for producing heat energy, which is consequently distributed along the circulatory system. At fixed frequency, the heart's systolic period sends blood out of the ventricle. Subsequently, the diastolic period rushes blood in from the circulatory system into the ventricle. Therefore, blood enters the arteries predictably wave after wave. Heat energy is transmitted through the circulatory system in all humans and mammals by the systole and diastole processes of the heart. Current electric thermometers take measurements with a sole frequency of one second per cycle. Surface skin temperature in the cavity will continually be shifted onto the measuring tip of the thermometer while vasoconstriction at the contact area will cause pressure build up for the next systolic and diastolic cycle. However, it is clear that average heart beat pulse does not function at the rate of one second per cycle. That means thermal compensation distributed along the circulatory system in wave after wave does not function as well at the rate of one second per cycle.

Therefore, if an electric medical thermometer takes the heart beat pulse as the sampling frequency instead of using the frequency of one second per cycle, more stable temperature signals while thermal compensating are attained. And therefore, more precise and reliable temperature measurement can be achieved, owing to the fact that existing electric medical thermometers reach thermal equilibrium defined by detecting a temperature increase no greater than 0.1° C. or 0.05° C. within a sampling period of 4 or 8 seconds and with a sampling frequency of one second per cycle. The problem of inconsistent measurements becomes apparent due to measurements being made at contrasting phases of the normal heart beat cycle such as a trough point or a crest point. The influence of this flaw is pronounced when said defined thermal equilibrium is approached. Consequently, electric medical thermometers appear in general medical tests with a difference of between 0.1 to 0.2 degree Celsius comparing to medical thermometers of Mercury.

SUMMARY OF THE INVENTION

The purpose of this invention is to provide an electric medical thermometer with more precise and more reliable in temperature measuring of patients.

In order to achieve the above goal, the technical plan adopted in this invention is as follows.

An electric medical thermometer for measuring temperature of patients in cavity, comprising a temperature detecting device for capturing temperature signals and a temperature calculating device for processing the temperature signals. The characteristic feature is that the temperature calculating device translates the temperature signals captured by the temperature detecting device while utilizing a primary sampling frequency and a secondary sampling frequency into a temperature measurement of patients, where the primary sampling frequency is greater than the secondary sampling frequency.

Preferential, the primary sampling frequency is $\geq 2.0$ Hz sampling in between power-on and cavity contact and the secondary sampling frequency is $60/72 \pm 30\%$ seconds per cycle.

Preferential, the primary sampling frequency is $\geq 2.0$ Hz sampling in between power-on and cavity contact, and the secondary sampling frequency is an estimated value of average heart beat pulse obtained by a calculation.

Preferential, the calculation is based on taking the reciprocal of the timing difference in between the first inflection point and the second inflection point on a function of temperature versus time.

Preferential, the calculation is based on taking the reciprocal of the timing difference in between the first inflection point and the $n^{th}$ inflection point divided by n−1 on a function of temperature versus time, where n is an integer of greater than 1.

Preferential, a means of switching from the primary sampling frequency to the secondary sampling frequency is determined by a calculation of temperature signals obtained from the period of the primary sampling frequency.

Preferential, a means of switching from the primary sampling frequency to the secondary sampling frequency is determined by recognizing an increase of initial temperature signal during the period of the primary sampling frequency.

Preferential, the temperature signals obtained during the period of the secondary sampling frequency or both the temperature signals obtained during the period of the primary sampling frequency and that of the secondary sampling frequency are processed with a specific formula or algorithm to predict a temperature measurement so as to reduce measuring time.

Comparing with existing technology, skin temperature on the surface of contact cavity during the process of measuring will continually be shifted onto the measuring tip of the thermometer while vasoconstriction at the contact area will cause pressure build up for the next systolic and diastolic cycle. As compensation to thermal equilibrium, heat energy produced by muscle tissue is transmitted through the circulatory system in all humans and mammals by the systole and diastole processes of the heart in wave after wave.

Current electric thermometers with existing technology take measurements with a sole frequency of one second per cycle and attain thermal equilibrium defined by detecting a temperature increase no greater than 0.1° C. or 0.05° C. within a sampling period of 4 or 8 seconds and with a sampling frequency of one second per cycle. The problem of inconsistent measurements becomes apparent due to measurements being made at contrasting phases of the normal heart beat cycle such as a trough point or a crest point. The influence of this flaw is pronounced when said defined thermal equilibrium is approached. Consequently, reduced accuracy becomes the result due to the uncertainty of heat compensation.

The electric medical thermometer of the present invention, comprising a temperature calculating device being capable of attaining inflection points with temperature values while oscillating at primary sampling frequency, then accordingly switching to secondary sampling frequency calculated by taking the reciprocal of the timing difference during the period of the primary sampling frequency, which is an approximate value to heart beat pulse performed as a regular thermal compensation in wave after wave, and translates temperature signals captured by the temperature detecting device into temperature values to provide an accurate measuring result in body temperature measuring, where the primary sampling frequency is greater than the secondary sampling frequency.

Consequently, the electric medical thermometer takes the estimated heart beat pulse as the sampling frequency instead of using the frequency of one second per cycle and achieves a temperature measurement with more precise and reliable result. Furthermore, the temperature signals obtained during the period of the secondary sampling frequency or both the temperature signals obtained during the period of the primary sampling frequency and that of the secondary sampling frequency are processed with a specific formula or algorithm to predict a temperature measurement so as to reduce measuring time.

DETAILED DESCRIPTION OF THE PREFERRED EMBODIMENTS

In order to realize the purpose and translate concerned technical plan with advantages of the present invention, the following is detailed description of the technical plan in accordance with the principles of the present invention, considering specific embodiments and attached figures.

Principle idea for an electric medical thermometer of the present invention is considering physiology in the very beginning and implementing the estimated heart beat pulsating as sampling frequency for reliable temperature measurement with precision.

Figure 1:
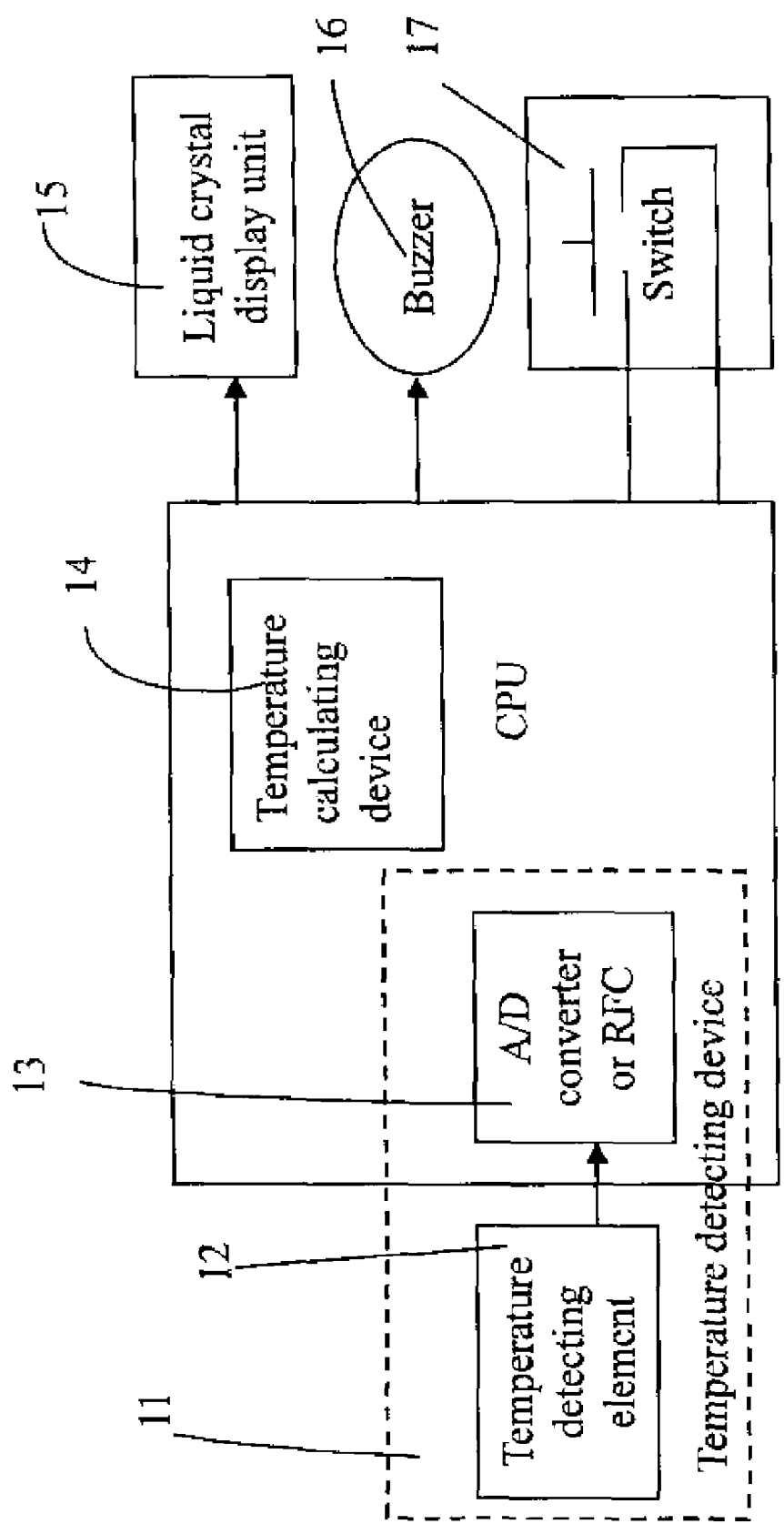
FIG. 1 is a basic structure block diagram of preferential first embodiment in accordance with the principles of the present invention.

As illustrated in FIG. 1, which shows a basic structure block diagram of an electric medical thermometer of preferential first embodiment in accordance with the principles of the present invention. It mainly consists of a temperature detecting set 11, including a temperature detecting element 12, for presenting temperature signals and an A/D converter to convert presented temperature signals or a resistance-frequency converter (RFC) 13, a temperature calculating device 14 for analysis and processing temperature signals and estimated heart beat pulse frequency, a liquid crystal display unit 15 to display measurement and/or heart beat pulse frequency, a buzzer 16 to signal when thermal equilibrium is attained and a switch 17 for activation of circuit.

The temperature detecting element 12, A/D converter or a resistance-frequency converter (RFC) 13, temperature calculating device 14 and liquid crystal display unit 15 are connected in series in turn. Furthermore, the temperature calculating device 14 is connected with buzzer 16 and switch 17. Among them, temperature detecting element 12 is a thermistor or other heat transducer.

When the electric medical thermometer is used for medical treatment or nursing at home, the temperature detecting element 12 can be placed in mouth, in armpit or in rectum to measure temperature. When switch 17 is activated, temperature detecting element 12 measures temperature and converts into analog electronic signal, which is converted into digital signal by A/D converter or a resistance-frequency converter (RFC) 13. This digital signal is input into temperature calculating device 14. Through processing of the temperature calculating device 14, the result is transmitted into liquid crystal display unit 15 for displaying, and into buzzer 16 to signal for the thermal equilibrium.

In order to obtain more reliable temperature measurement with higher precision, the temperature calculating device 14 of the electric medical thermometer in this embodiment performs sampling and processing according to the estimated heart beat pulse frequency. The temperature calculating device 14 performs sampling and processing in the following 2 modes which detailed description are as follows.

Figure 2:
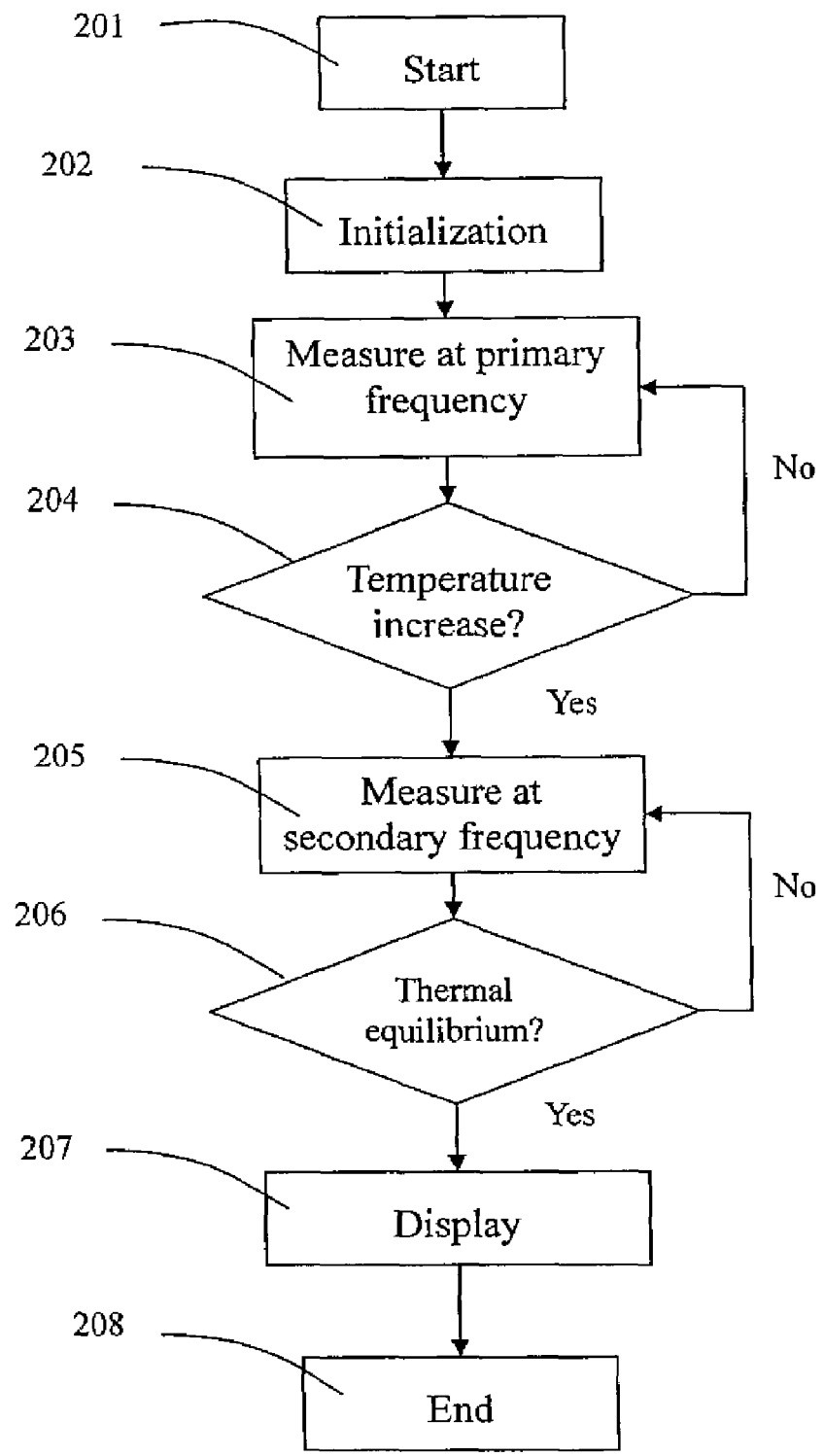
FIG. 2 is a basic functional flow diagram of preferential first embodiment in accordance with the principles of the present invention.

As illustrated in FIG. 2, which shows a procedure flow diagram of an electric medical thermometer in this embodiment. The main steps are as follows.

Step 201. Press down switch 17 to activate internal electric circuit of the electric medical thermometer.

Step 202. The temperature calculating device 13 performs initialization.

Step 203. Environmental temperature is detected. The temperature detecting element 12 measures temperature and converts into analog electronic signal, which is converted into digital signal by A/D converter or a resistance-frequency converter (RFC) 13. This digital signal is input into temperature calculating device 14. The temperature detecting element 12 is exposed in a stable temperature environment.

Figure 3:
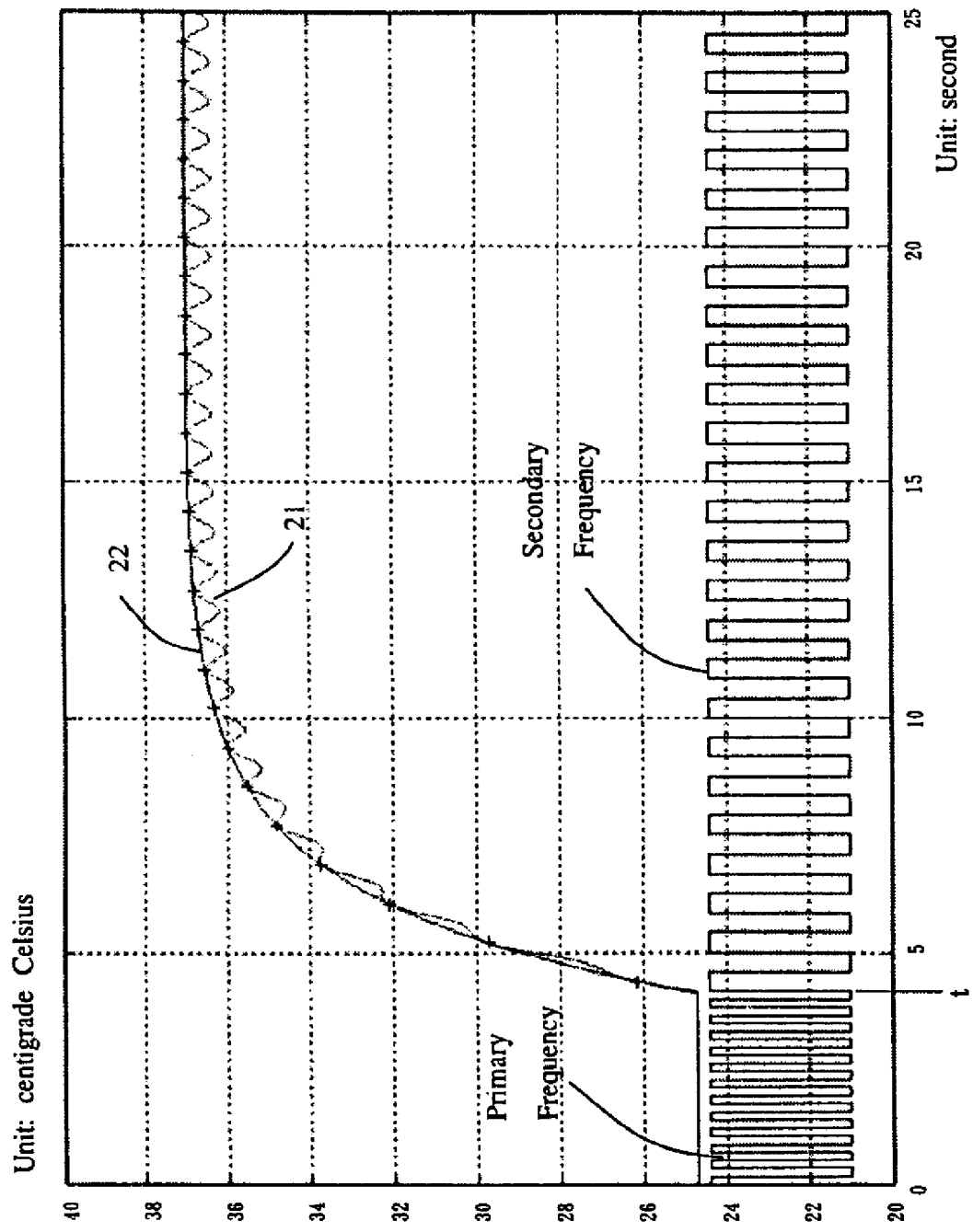
FIG. 3 is a function of temperature versus time of preferential first embodiment in accordance with the principles of the present invention.

FIG. 3 is a function of temperature versus time with the present invention. As illustrated in FIG. 3, the temperature calculating device 14 performs sampling at primary sampling frequency, which is equal to 10 Hz and is the sampling frequency of 0 to $n^{th}$ second in FIG. 3. The higher the sampling frequency is, the faster the temperature increase responses, so as to reduce time from measuring.

The temperature value processed by temperature calculating device 14 and the temperature value shown by liquid crystal display unit 15 are outside environmental temperature.

Step 204. The temperature calculating device 14 detects temperature increase. If temperature increased, the secondary sampling frequency performs examination of increasing temperature signals. Otherwise, the primary sampling frequency remains in function until automatic shut-off of the instrument.

Generally, the definition of temperature increase is to recognize temperature becoming superior to initial value in default period. For example, if sampling at 10 Hz, the temperature increase is defined by being greater than initial value (such as 0.1 degree Celsius) in millisecond.

Step 205. When rising temperature is detected, that is, from time t, temperature detecting element 12 contacts heat source, temperature detecting element 12 measures temperature and converts into analog electronic signal, which is converted into digital signal by A/D 13. This digital signal is input into temperature calculating device 14.

When temperature detecting element 12 contacts heat source, its thermal equilibrium condition with the heat source does not reach immediately and there is a rising course, which is a temperature rising step from $t^{th}$ second to $25^{th}$ second.

Temperature rising condition is established, sampling frequency is changed to the frequency during $t^{th}$ second to $25^{th}$ second, see FIG. 3. Sampling at secondary sampling frequency temperature rising curve measured is as in FIG. 3. Because of systole of the heart, heat source is transmitted out, the frequency of heat source and heart pulse wave by wave can be measured, and curve 21 of temperature versus time curve, in FIG. 3, can be obtained. Curve 22 is a temperature versus time curve calculated by temperature calculating device 14 according to sampling frequency.

According to medical statistics, the average heart beat pulse of healthy adults is around 72 beats per minute—the frequency is 1.2 Hz. Therefore, after switching from recognizing temperature increase, secondary sampling frequency functions at 1.2 Hz imitating heart beat pulse for capturing temperature signals. The electric medical thermometer takes the same phase position as heart beat pulse, so as to assure the thermal conducting in stable condition.

Figure 4:
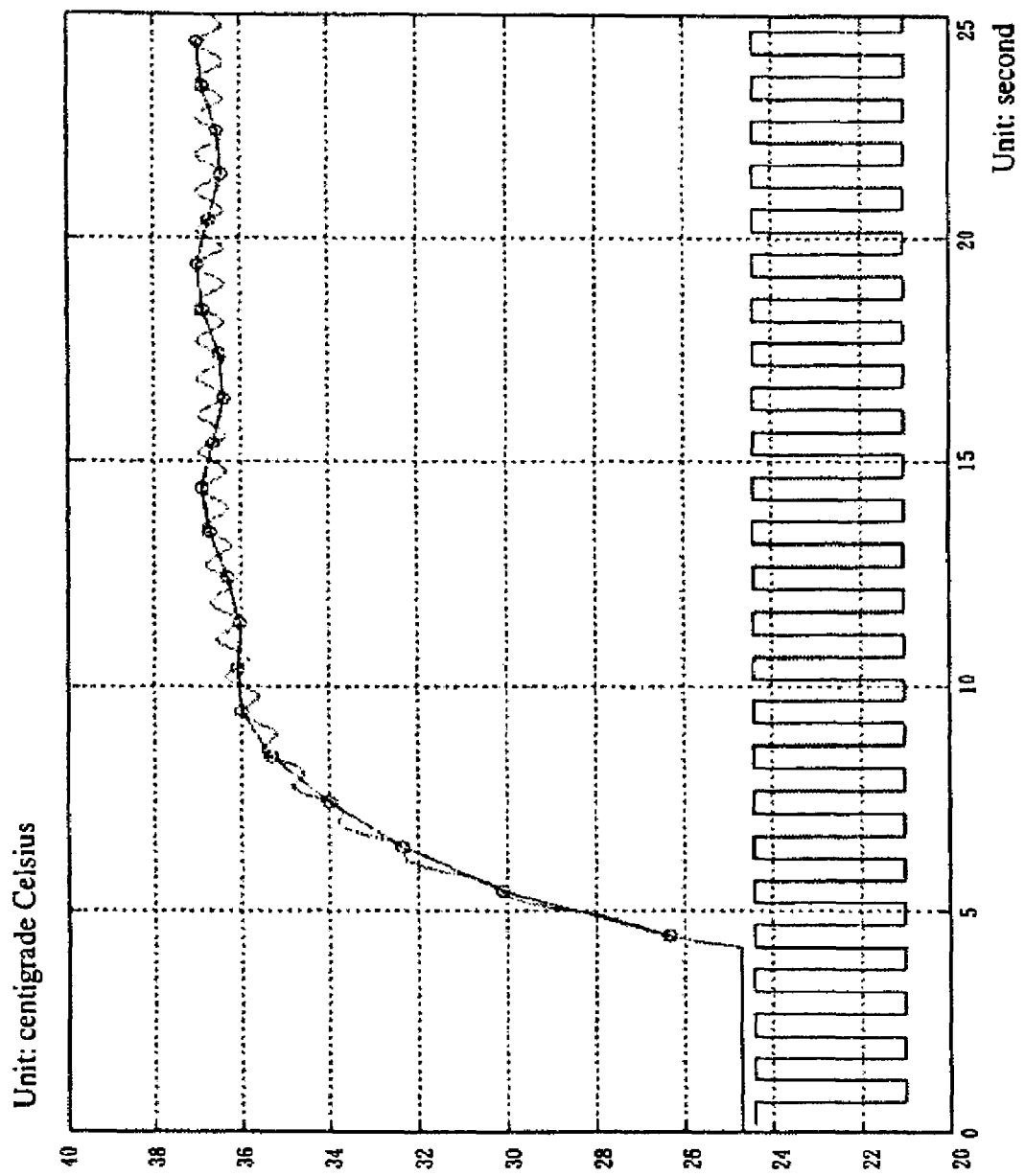
FIG. 4 is a function of temperature versus time of electric thermometer with existing technology.

Considering the heart beat pulse differs from individuals, 1.2 Hz cannot be taken as the sampling frequency for everyone. So after temperature rising condition is established, even quicker sampling frequency can be used, for example, 180 beats per minute, i.e., sampling frequency is 3 Hz to obtain each heat energy peak transmitted into all human organisms by systole of the heart To check the temperature in temperature versus time curve for peak, the method in FIG. 4 can be adopted.

Figure 5:
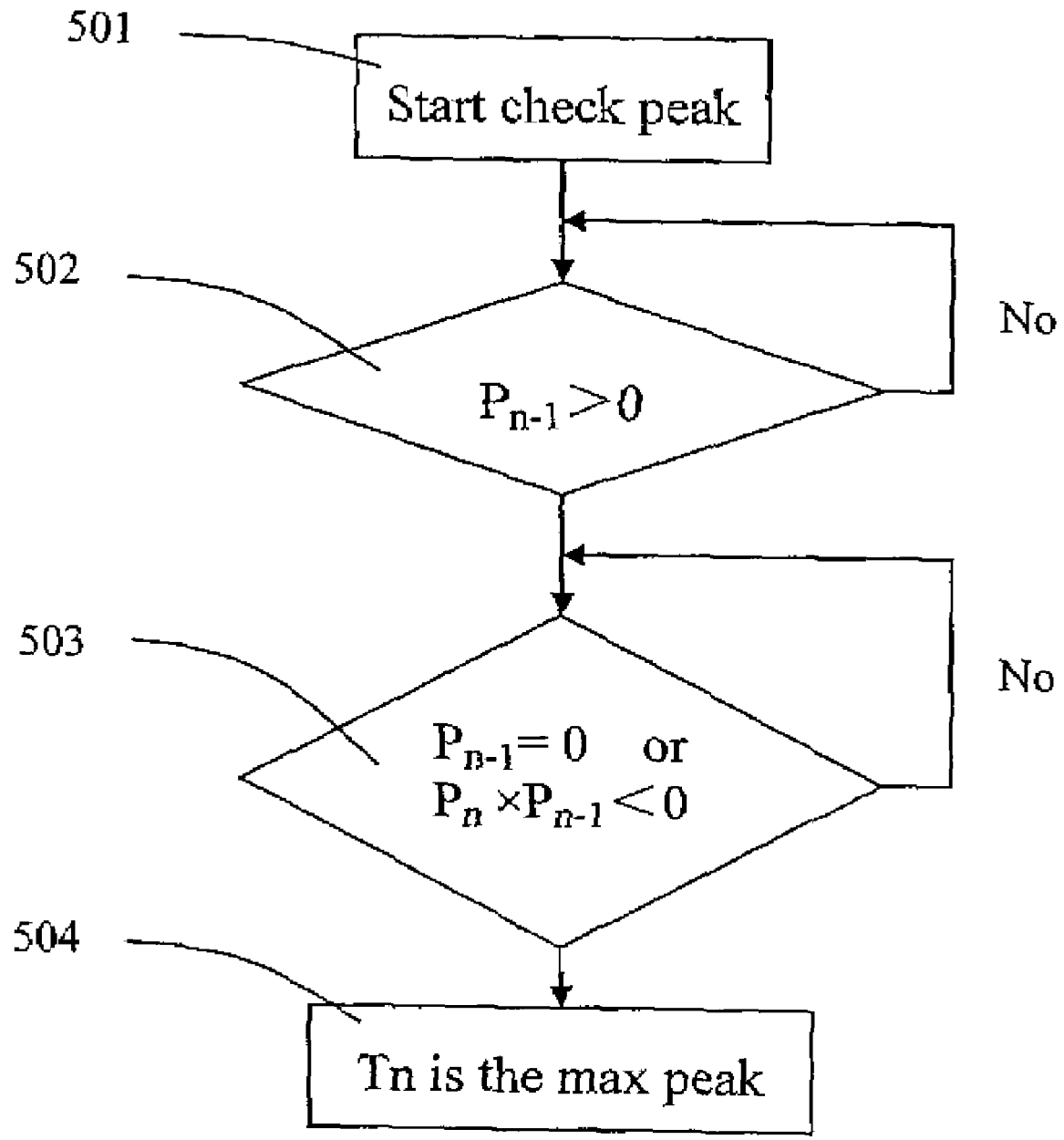
FIG. 5 is a procedure block diagram recognizing the peak temperatures of preferential first embodiment in accordance with the principles of the present invention.

As shown in FIG. 5, which is a step course chart to check temperature for peak according to temperature versus time curve for temperature change each time along with systole of the heart and blood flow. The main steps include the following.

Step A. Peak check starts.

Step B. The temperature calculating device 14 makes derivation to temperature versus time curve, that is, $$P_n = \frac{T_n - T_{n-1}}{t_n - t_{n-1}} \quad (1)$$

Where, $T_n$ is the temperature measured at $t_n$, $T_{n-1}$ is the temperature measured at $t_{n-1}$. Check $P_{n-1}>0$ and $P_n=0$ for tenableness. If they are tenable, the temperature measured at $t_n$ is the maximum peak, and temperature calculating device 14 samples at $t_n$. Otherwise, no sampling. At the same time, Step 503 can also be used to check for peak.

Step C. Or, check $P_{n-1}>0$ and $P_{n-1} \times P_n<0$ for tenableness. If they are tenable, there is a peak and the temperature measured at $t_n$ is the maximum peak.

Step D. $T_n$ is decided as the maximum peak.

By above method, the temperature peak can be calculated, so the electric medical thermometer obtains the highest value in rising temperature of every wave at every time point to make temperature quickly climb. Because of the same phase, especially in thermal equilibrium stage after t=25, the temperature value will not be as the same as sampling at primary sampling frequency second. Different sampling phases cause temperature value to wave up and wave down. It can be quickly met that the temperature change per second within continuous 4 seconds or 8 seconds is no more than 0.05° C. so as to reduce measure time.

At the same time, the above same phase as heart pulse or the highest peak can be used to calculate time difference at the same phase or the highest peak, which means the time needed by a heart pulse. And the time difference can be used to calculate speed rate of the heart pulse. Or the time difference between two adjacent inflexion points can also be used to calculate speed rate of the heart pulse.

Step 206. The temperature calculating device 14 checks temperature detecting element 12 and the heat source contacted by it for thermal equilibrium. If thermal equilibrium, Step 207 and Step 208 should be performed.

Otherwise, the quicker sampling secondary sampling frequency is always used for the sampling frequency to reflect real time temperature change, until thermal equilibrium is reached through check.

As above, to check for thermal equilibrium is to check the temperature change value in a certain time for less than a certain value. If yes, thermal equilibrium is reached.

When thermal equilibrium is reached by check, the temperature versus time curve will be relatively stable. Because of the same phase, especially in thermal equilibrium stage after time 25 sec, the temperature versus time curve will be fairly flat. But because of different sampling phases, temperature signal will wave up-down. As the temperature versus time curve shown in FIG. 3. There are more up-down waves in actual temperature versus time curve, so there are also more up-down waves in the temperature versus time curve calculated by temperature calculating device 14, and it can be quickly met that the temperature change per second within continuous 4 seconds or 8 seconds is no more than 0.05° C. so as to reduce measure time.

Step 207. The temperature calculating device 14 transmits measured temperature calculated and speed rate of the heart pulse calculated into liquid crystal display unit 15.

Step 208. The temperature calculating device 14 lets buzzer 16 to sound to express that measured temperature tends to stability.

The above mainly describes essential course of temperature measure and measure principle of the electric medical thermometer of the present invention through the basic structure block diagram of the electric medical thermometer. The following describes how to realize the above measure course and obtain measured temperature through specific electric circuit structure chart of the electric medical thermometer of preferential embodiment in accordance with the principles of the present invention.

Figure 6:
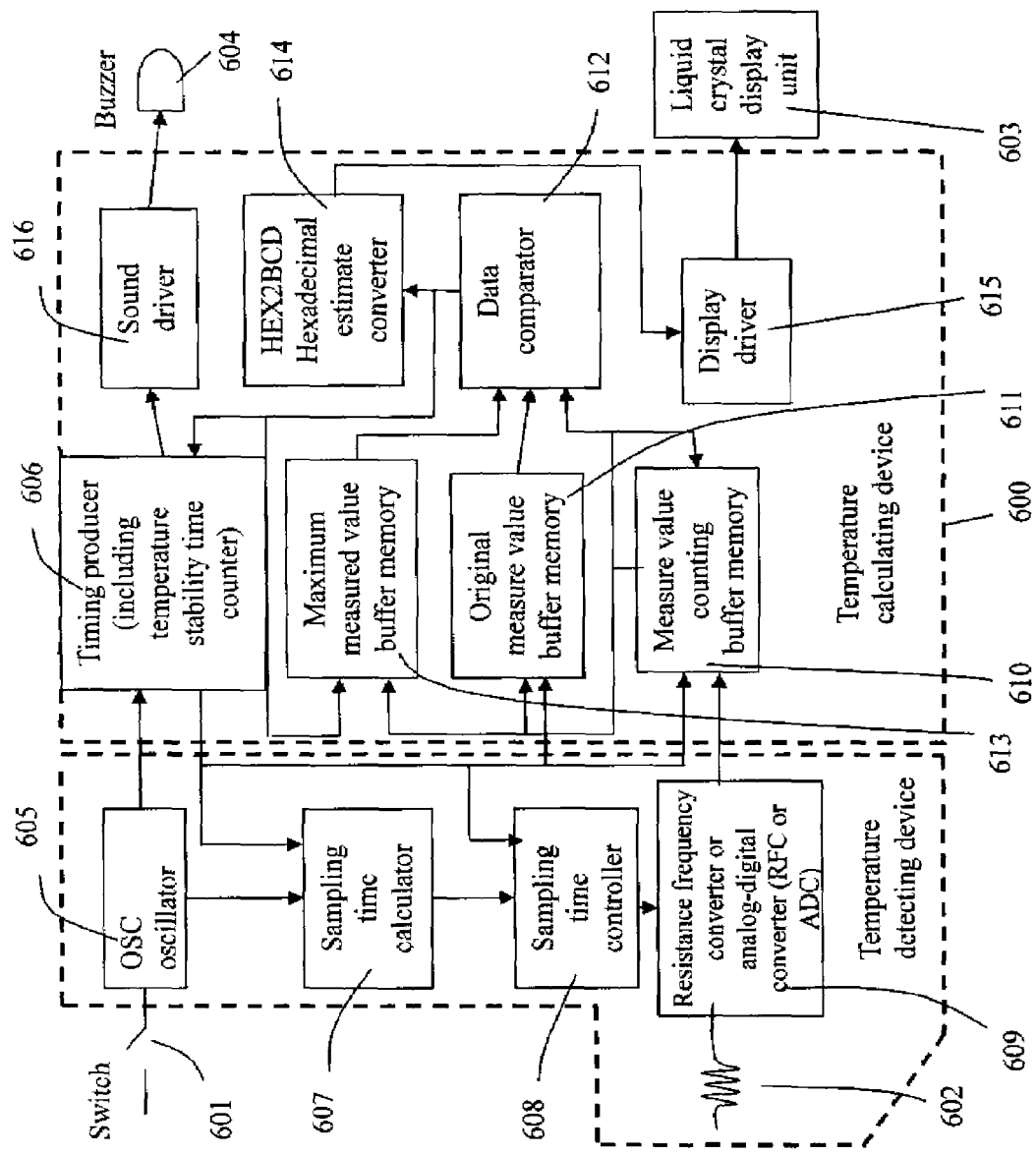
FIG. 6 is an electric circuit structure chart of preferential first embodiment in accordance with the principles of the present invention.

As shown in FIG. 6, which is a specific electric circuit structure chart of an electric medical thermometer of preferential first embodiment in accordance with the principles of the present invention. The electric medical thermometer of this embodiment mainly consists of a temperature calculating device 600, a switch 601, a temperature sensor set 602, a liquid crystal display 603 and a buzzer 604. Among them, temperature calculating device 600 also comprises OSC oscillator 605, a timing producer 606 (including a temperature stability time counter), a sampling time calculator 607, a sampling time controller 608, a resistance-frequency converter or an A/D converter (RFC or ADC) 609, a measured value counting buffer memory 610, an initial measured value buffer memory 611, a data comparator 612, a Maximum measured value buffer memory 613, HEX2BCD hexadecimal estimate converter 614, a display driver 615 and a sound driver 616.

The circuit connection so that OSC oscillator 605, sampling time calculator 607, sampling time controller 608, resistance-frequency converter or an A/D converter (RFC or ADC) 609, a measured value buffer counting memory 610, data comparator 612, timing producer 606 are connected in turn into a series circuit. At the same time, the timing producer 606 is connected with sampling time calculator 607, sampling time controller 608, measured value buffer counting memory 610, initial measured value buffer memory 611, Maximum measured value buffer memory 613, and sound driver 616. The initial value buffer memory 611 and Maximum measured value buffer memory 613 are also connected with data comparator 612. The measured value buffer counting memory 610 is separately connected with initial value buffer memory 611 and Maximum measured value buffer memory 613. The switch 601 is connected with OSC oscillator 605. The temperature sensor set 602 is connected with resistance-frequency converter or an A/D converter (RFC or ADC) 609. The data comparator 612, HEX2BCD hexadecimal estimate converter 614, display driver 615 and liquid crystal display 603 are connected in turn. The sound driver 616 is connected with buzzer 604.

Figure 7:
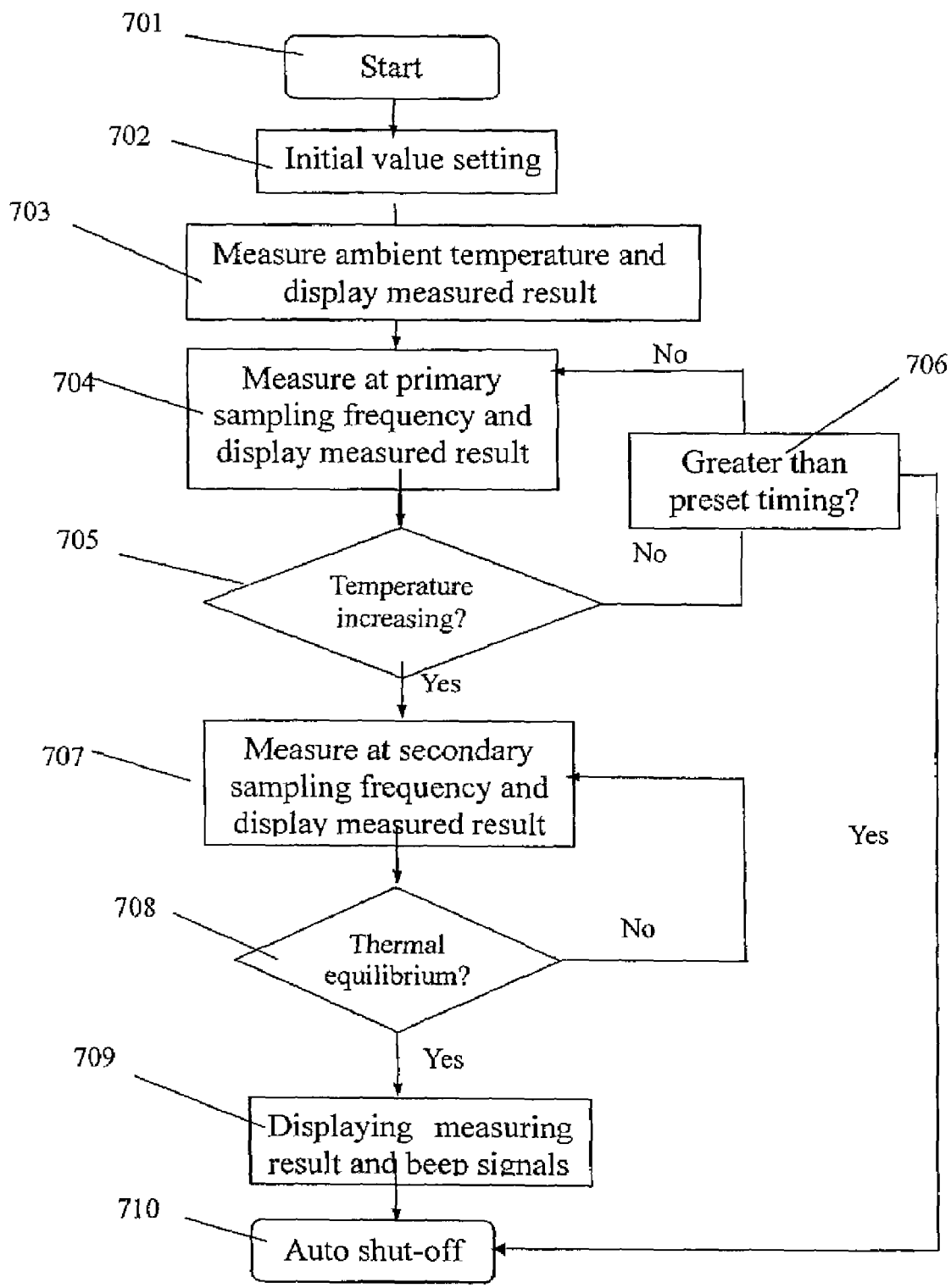
FIG. 7 is a specific functional flow diagram of preferential first embodiment in accordance with the principles of the present invention.

Specific course to measure temperature of the electric medical thermometer is shown in FIG. 7. The main steps are as follows.

Step 701. Start. The electric medical thermometer starts running.

Start switch 601 of the electric medical thermometer. OSC oscillator 605 produces basic system work frequency to drive the whole electric circuit system.

Step 702. Perform initial setting. Set default values into every controller in the electric circuit. When the electric medical thermometer starts, the temperature value stored in the initial value buffer memory 611 and the preset temperature value in maximum temperature buffer memory 613 may be set as zero, or a special temperature value.

Step 703. Measure ambient temperature and display the measured result.

Perform ambient temperature measure and the measured results are stored in initial value buffer memory 611 and Maximum measured value buffer memory 613, and converted into temperature values to be shown on liquid crystal display 603.

OSC oscillator 605 drives timing producer 606 which produces various preset frequencies and corresponding control signals to output.

The sampling time calculator 607 decides sampling time according to preset sampling frequency, through sampling time controller 608, outputs the first sampling control signal when starting measure. The sampling time controller 608 controls resistance-frequency converter or an A/D converter (RFC or ADC) 609 to transmit the temperature signal from outside temperature sensor set 602 into digital signal to enter measured value counting buffer memory 610 to be calculated into digital measured result value.

The above measured result value is stored in initial value buffer memory 611, compared with the initial value already stored in Maximum measured value buffer memory 613 by data comparator 612. If the measured result value is larger than the initial value in Maximum measured value buffer memory 613, the measured result value is stored in Maximum measured value buffer memory 613 instead of the initial value, and output into temperature forecasting module. Because of the measure for the first time, the value must be larger than the initial value, this action must occur.

The measured result value is converted into decimal data by HEX2BCD estimate converter 614, and through display driver 615 to drive liquid crystal display 603 for showing the temperature value.

Step 704. Measure at sampling primary sampling frequency and display the measured result.

Perform next temperature measure at sampling primary sampling frequency. If the measured result value is larger than the former maximum value, the measured result value is stored in maximum measured value buffer memory and shown on liquid crystal display 603. In this method, perform temperature measure at sampling primary sampling frequency, which is larger than or equal to 2 Hz, the better above 10 Hz, so as to accurately master the time point to start measuring body temperature.

The timing producer 606 produces next sampling corresponding control signal output.

The sampling time calculator 607 decides sampling time according to preset sampling primary sampling frequency, through sampling time controller 608, outputs sampling control signal, controls resistance-frequency converter or an A/D converter (RFC or ADC) 609 to transmit the temperature signal from outside temperature sensor set 602 into digital signal to enter measured value counting buffer memory 610 to be calculated into digital measured result value.

The above measured result value is compared with the initial value already stored in Maximum measured value buffer memory 613 by data comparator 612. If the measured result value is larger than the initial value in Maximum measured value buffer memory 613, the measured result value is stored in Maximum measured value buffer memory 613 instead of the original stored value. The measured result value is compared with the initial value in initial value buffer memory 611 by data comparator 612, besides compared with the initial value in Maximum measured value buffer memory 613 by data comparator 612. If the measured result value is a special value larger than the value in initial value buffer memory 611, for example, it is over 0.2 centigrade Celsius after conversion, a signal is produced to trigger timing producer 606 to change sampling frequency, for example, changing to sampling secondary sampling frequency. Otherwise, repeat Step 704 at the same frequency i.e. sampling primary sampling frequency.

The measured result value is converted into decimal data by HEX2BCD hexadecimal estimate converter 614, and through display driver 615 to drive liquid crystal display 603 for showing the temperature value. At the same time, it outputs signal to make the temperature stability time counter in timing producer 606 turn to zero.

If the measured result value is smaller than the initial value in Maximum measured value buffer memory 613, no follow-up action.

Step 705. Check for rising temperature.

If the measured temperature value is a certain range greater than the first measure result, for example, over 0.2 centigrade Celsius, expressing the thermometer has started measuring temperature. Skip to Step 707. Otherwise, it expresses measure still in the ambient temperature.

In Step 704, the measured result value is compared with the initial value in initial value buffer memory 611 by data comparator 612, besides compared with the initial value in Maximum measured value buffer memory 613 by data comparator 612. If the measured result value is a special value larger than the value in initial value buffer memory 611, for example, it is over 0.2 centigrade Celsius after conversion, a signal is produced to trigger timing producer 606 to change sampling frequency. Otherwise, it outputs signal to make the temperature stability time counter in timing producer 606 increase a unit time.

Otherwise, it expresses measure still in the ambient temperature. Further check ambient temperature measure time for time-out to preset. If yes, directly enter Step 709 automatically to shut down. If preset time is not reached, continue measure in the ambient temperature.

Step 706. If measured temperature is not rising to a certain range, for example, over 0.2 centigrade Celsius, during a certain time, for example, 3 minutes, automatic shutting down.

If the measured result value is not a special value larger than the value in initial value buffer memory 611, for example, it is over 0.2 centigrade Celsius after conversion, a signal is output to make the temperature stability time counter in timing producer 606 increase a unit time. When the temperature stability time counter in timing producer 606 reaches an equivalent special time, for example, 3 minutes, the timing producer 606 produces a signal for automatic shutting down. If the temperature stability time counter in timing producer 606 reaches less than the special time, repeat Step 704 at the same frequency (sampling primary sampling frequency).

Step 707. Measure at sampling secondary sampling frequency and display the measured result.

When measured temperature is a certain range greater than the first measure result, for example, over 0.2 centigrade Celsius, expressing the thermometer has started measuring body temperature. In order to save electric power and obtain the temperature value synchronizing with heart pulse, switch into sampling secondary sampling frequency. This sampling secondary sampling frequency can synchronize with heart pulse frequency. For example, sampling secondary sampling frequency of 1.2 Hz, or sampling secondary sampling frequency equal to $$\frac{60}{72} \pm 30\%$$

second per time, so as to make sampling frequency synchronize with heart pulse to reach the same phase for each time sampling.

Specific calculation method for sampling secondary sampling frequency is that data comparator 612 makes derivation to temperature value versus sampling time curve, as above shown in (1):

$$P_n = \frac{T_n - T_{n-1}}{t_n - t_{n-1}}$$

Where, $T_n$ is the temperature measured at sampling time $t_n$, $T_{n-1}$ is the temperature measured at $t_{n-1}$. When $P_{n-1}>0$ and $P_n=0$ are tenable, or $P_{n-1}>0$ and $P_{n-1} \times P_n<0$ are tenable, the temperature measured at $t_n$ is the maximum peak, and timing producer 606 produces corresponding sampling secondary sampling frequency according to the time difference between two adjacent peaks or inflexion points.

If the measured result value is a special value larger than the value in initial value buffer memory 611, i.e. when $P_n>0$, for example, over 0.2 centigrade Celsius after conversion, a signal is produced to trigger timing producer 606 to change sampling frequency according to the time difference between two adjacent peaks or inflexion points, and produces next sampling corresponding control signal output.

The sampling time calculator 607 decides sampling time according to preset sampling secondary sampling frequency, through sampling time controller 608, outputs sampling control signal. The sampling time controller 608 controls resistance-frequency converter or an A/D converter (RFC or ADC) 609 to transmit the temperature signal from outside temperature sensor set 602 into digital signal to enter measured value counting buffer memory 610 to be calculated into digital measured result value.

The above measured result value is compared with the initial value already stored in Maximum measured value buffer memory 613 by data comparator 612. If the measured result value is larger than the initial value in Maximum measured value buffer memory 613, the measured result value is stored in Maximum measured value buffer memory 613 instead of the original stored value. The measured result value is converted into decimal data by HEX2BCD hexadecimal estimate converter 614, and through display driver 615 to drive liquid crystal display 603 for showing the temperature value. At the same time, it outputs signal to make the temperature stability time counter in timing producer 606 turn to zero.

If the measured result value is smaller than the initial value in Maximum measured value buffer memory 613, it outputs signal to make the temperature stability time counter in timing producer 606 increase a unit time, but no output signal to HEX2BCD hexadecimal estimate converter 614.

Step 708. Check for thermal equilibrium.

Check measured temperature during a time, e.g. 4 sec, 8 sec or 16 sec, for continuous rise. If no greater temperature value is measured, it expresses the thermometer with body temperature has tended to thermal equilibrium, and a finish signal is output. If greater temperature value is measured, measure is continued.

When the temperature stability time counter in timing producer 606 reaches an equivalent special time, for example, 4 sec, 8 sec or 16 sec, if $P_n$ is always 0.2 to 0.5 centigrade Celsius smaller than a preset value, it expresses there is no greater temperature value during this special time, timing producer 606 will at certain timing sequence trigger sound driver 616.

If thermal equilibrium does not reach by check, repeat Step 706.

Step 709. The liquid crystal display 603 shows and buzzer 604 sounds to express that measured temperature value has tended to stability.

The liquid crystal display 603 continuously shows the highest measured value, during 4 sec, 8 sec or 16 sec. If no greater temperature value is measured, buzzer 604 will send a series or preset sound to express the measured value has tended to stability.

Step 710. Automatic shut.

The liquid crystal display 603 continuously shows for a certain time, e.g. 10 minutes, then automatic shut.

Above descriptions are the electric circuit structure and operation course of the first embodiment in accordance with the principles of the present invention. However, the present invention will not be limited to this, there are also multiple embodiments as follows.

Figure 8:
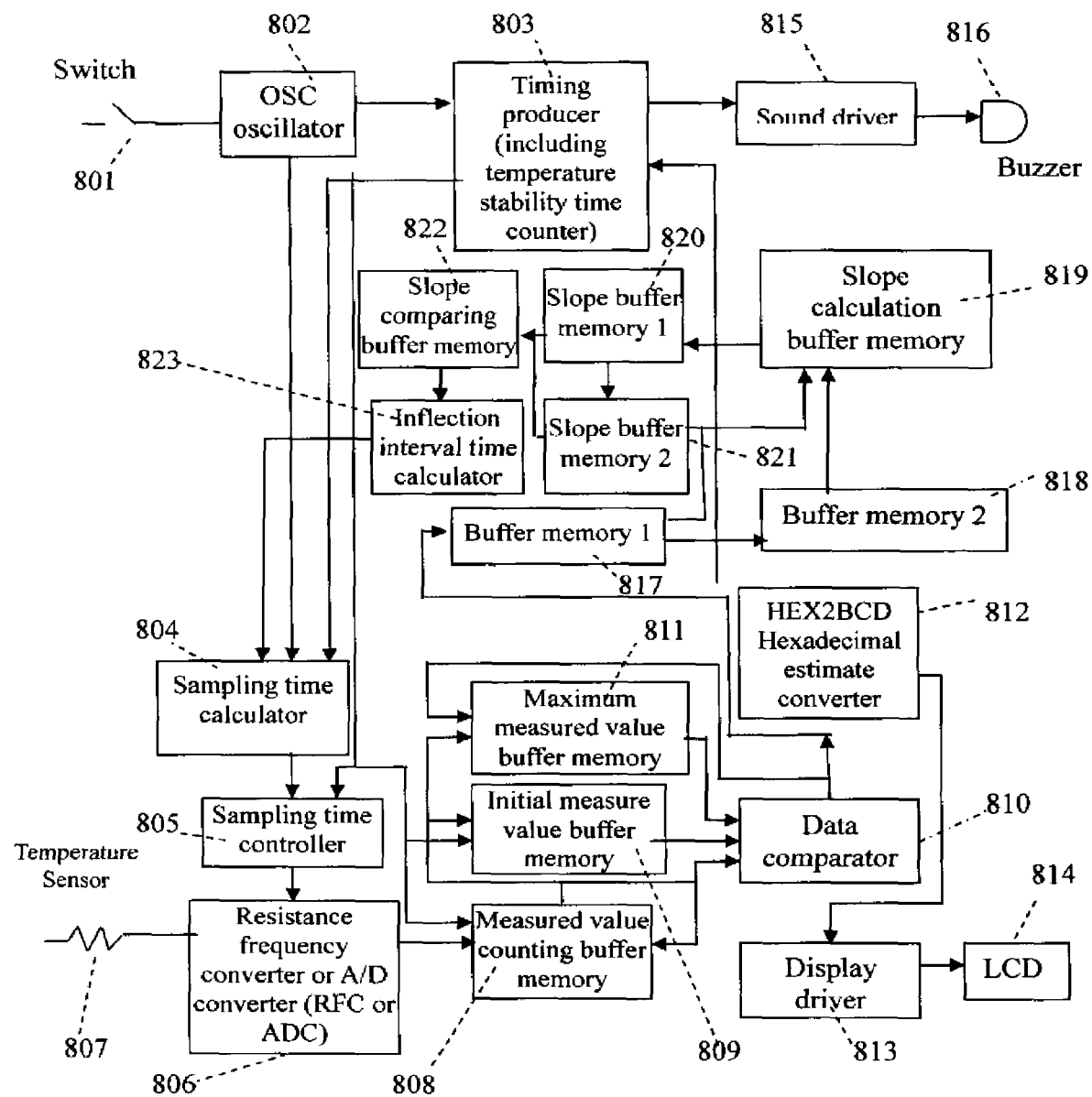
FIG. 8 is an electric circuit structure chart of preferential second embodiment in accordance with the principles of the present invention.

As shown in FIG. 8, which is a specific electric circuit structure chart of an electric medical thermometer of preferential second embodiment in accordance with the principles of the present invention. Its basic structure is similar to a specific electric circuit structure chart of an electric medical thermometer of the first embodiment The differences are that the starting point of rising temperature is obtained by adjusting sampling time faster, the first and the second inflexion points in temperature versus time climbing curve are calculated, and the time difference between the two inflexion points is taken as sampling time value to measure body temperature.

After start, pre-set the sampling time controller as quick sampling. Ambient temperature is obtained by the sensor, A/D converter and counting buffer memory and stored into the max value buffer memory. The next temperature measured value from the counting buffer memory is compared with the max value buffer memory by a data comparing buffer memory to check for greatly rising temperature. If no, the counting buffer memory is stored into the max value buffer memory to measure, until automatic shut. At the same time, slope buffer memory 1 turn to zero. So the starting point of rising temperature is obtained, at the same time a slope value is sent to slope buffer memory 1.

After sampling at rising temperature, data of the counting buffer memory renew. Buffer memory 1 moves to buffer memory 2, and buffer memory 1 is renewed by data comparing buffer memory. At the same time, the difference between former and later slope is obtained by the slope comparing buffer memory and in turn stored into slope buffer memory 1 and slope buffer memory 2. The sampling time calculator compares the slope difference of continuous sampling, obtains the first and the second inflexion points of slope. At the same time, the interval time is measured by sampling time calculator and sent into sampling time controller to make sampling speed of temperature synchronize with the heart pulse speed.

Perhaps, the starting point of rising temperature is obtained by adjusting sampling time faster, No. 1 inflexion point and No. n inflexion point in temperature versus time climbing curve are calculated, and the average value of the time difference between n inflexion points is taken as sampling time value to measure body temperature.

Figure 9:
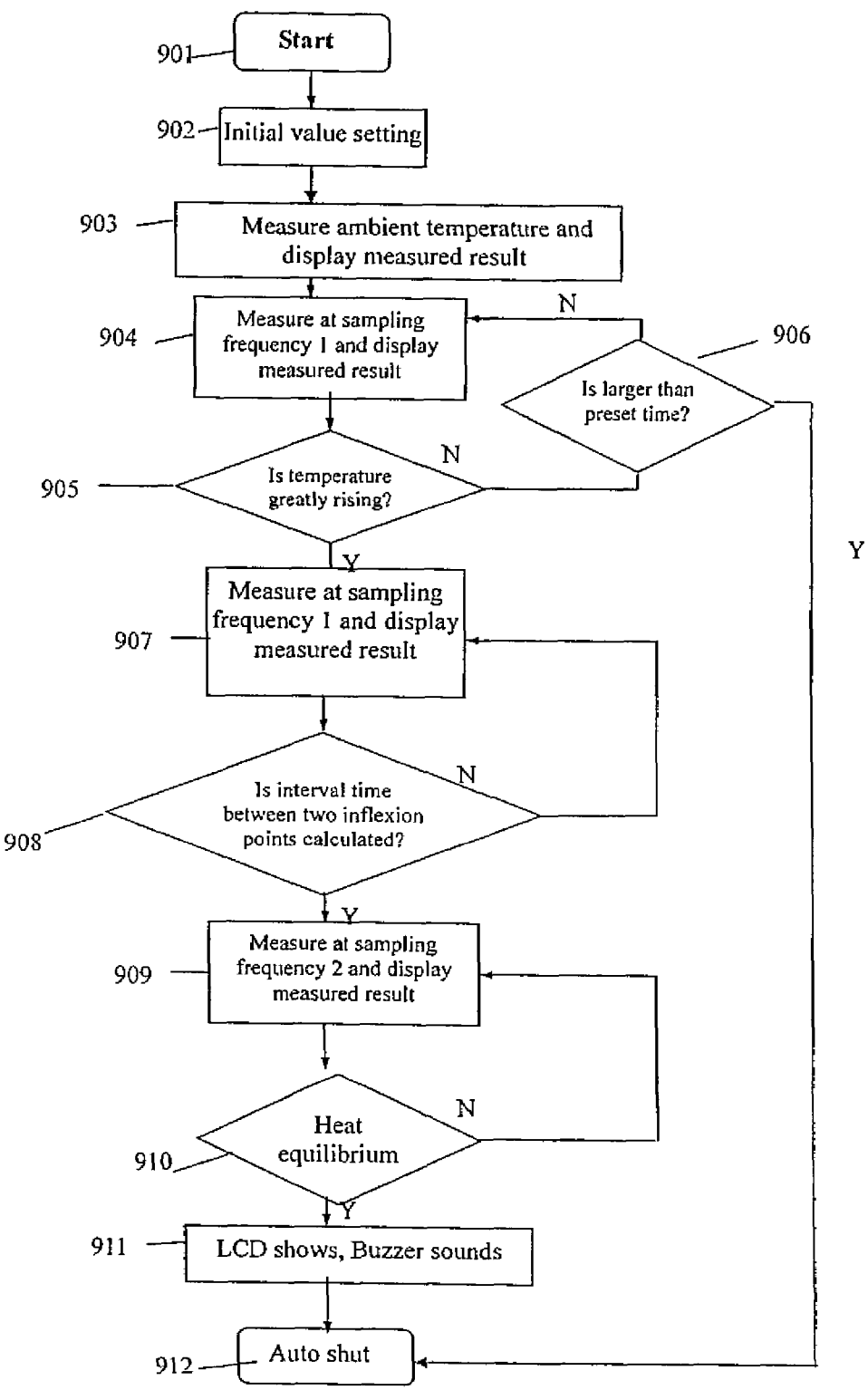
FIG. 9 is a specific functional flow diagram of preferential second embodiment in accordance with the principles of the present invention.

The operation course of the second embodiment is shown in FIG. 9. Its operation course is similar to the operation course of the first embodiment. Specific course is described as follows.

Step 901. Start.

The electric medical thermometer starts running. When starting switch 801 of the electric medical thermometer, OSC oscillator 802 produces basic system work frequency to drive the whole electric circuit system.

Step 902. Initial value is set.

First perform initial setting. Set default values into every controller in the electric circuit.

Step 903. Measure ambient temperature and display measured result.

Perform ambient temperature measure and the measured results are stored in initial value buffer memory and maximum measured value buffer memory, and converted into temperature values to be shown on LCD. OSC oscillator 802 drives timing producer 803 which produces various preset frequencies and corresponding control signals to output.

The sampling time calculator 804 decides sampling time according to preset sampling frequency, through sampling time controller 805, outputs the first sampling control signal when starting measure, and controls resistance-frequency converter or an A/D converter (RFC or ADC) 806 to transmit the temperature signal from outside temperature sensor set 807 into digital signal to enter measured value counting buffer memory 808 to be calculated into digital measured result value.

The above measured result value is stored in initial value buffer memory 809, compared with the initial value already stored in temperature memory of maximum 811 by data comparator 810. If the measured result value is larger than the initial value in temperature memory of maximum 811, the measured result value is stored in temperature memory of maximum 811 instead of the initial value. Because of the measure for the first time, the value must be larger than the initial value, this action must occur.

The measured result value is converted into decimal data by HEX2BCD estimate converter 812, and through display driver 813 to drive liquid crystal display (LCD) 814 for showing the temperature value.

Step 904. Measure at sampling primary sampling frequency and display the measured result.

Perform next temperature measure at sampling primary sampling frequency. If the measured result value is larger than the former maximum value, the measured result value is stored in maximum measured value buffer memory and shown on LCD.

In this method, perform temperature measure at sampling primary sampling frequency, which is larger than 2 Hz, the better above 10 Hz, so as to accurately master the time point to start measuring temperature.

The timing producer 803 produces next sampling corresponding control signal output.

The sampling time calculator 804 decides sampling time according to preset sampling primary sampling frequency, through sampling time controller 805, outputs sampling control signal, controls resistance-frequency converter or an A/D converter (RFC or ADC) 806 to transmit the temperature signal from outside temperature sensor set 807 into digital signal to enter measured value counting buffer memory 808 to be calculated into digital measured result value.

The above measured result value is compared with the initial value already stored in temperature memory of maximum 811 by data comparator 810. If the measured result value is larger than the initial value in temperature memory of maximum 811, the measured result value is stored in temperature memory of maximum 811 instead of the original stored value. The measured result value is converted into decimal data by HEX2BCD hexadecimal estimate converter 812 and through display driver 813 to drive liquid crystal display (LCD) 814 for showing the temperature value. At the same time, the measured result value is stored into buffer memory 817 and a signal is output to make the temperature stability time counter in timing producer 803 turn to zero. The value of buffer memory 817 is again stored into buffer memory 818.

If the measured result value is smaller than the initial value in temperature memory of maximum 811, no follow-up action.

Step 905. Check for greatly rising temperature.

If the measured temperature value is a certain range greater than the first measure result, for example, over 0.2 centigrade Celsius, expressing the thermometer has started measuring body temperature. Skip to Step 907. Otherwise, it expresses measure still in the ambient temperature. In Step 904, the measured result value is compared with the initial value in initial value buffer memory 809 by data comparator 810, besides compared with the initial value in temperature memory of maximum 811 by data comparator 810. If the measured result value is a special value larger than the value in initial value buffer memory 809, for example, it is over 0.2 centigrade Celsius after conversion, a signal is produced to trigger timing producer 803 to change sampling frequency. Otherwise, it outputs signal to make the temperature stability time counter in timing producer 803 increase a unit time.

Step 906. If measured temperature is not rising to a certain range, for example, over 0.2 centigrade Celsius, during a certain time, for example, 3 minutes, automatic shutting down.

If the measured result value is not a special value larger than the value in initial value buffer memory 809, for example, it is over 0.2 centigrade Celsius after conversion, a signal is output to make the temperature stability time counter in timing producer 803 increase a unit time. When the temperature stability time counter in timing producer 803 reaches an equivalent special time, for example, 3 minutes, the timing producer 803 produces a signal for automatic shutting down. If the temperature stability time counter in timing producer 803 reaches less than the special time, repeat Step 904 at the same frequency (sampling primary sampling frequency).

Step 907. Measure at sampling primary sampling frequency and display the measured result.

When measured temperature is a certain range greater than the first measure result, for example, over 0.2 centigrade Celsius, expressing the thermometer has started measuring body temperature.

If the measured result value is a special value larger than the value in initial measured value buffer memory 809, for example, over 0.2 centigrade Celsius after conversion, a signal is produced to trigger timing producer 803 to produces next sampling corresponding control signal output at the original sampling frequency.

The sampling time calculator 804 decides sampling time according to preset sampling primary sampling frequency, through sampling time controller 805, outputs sampling control signal, and controls resistance-frequency converter or an A/D converter (RFC or ADC) 806 to transmit the temperature signal from outside temperature sensor set 807 into digital signal to enter measured value counting buffer memory 808 to be calculated into digital measured result value.

The above measured result value is compared with the initial value already stored in temperature memory of maximum 811 by data comparator 810. If the measured result value is larger than the initial value in temperature memory of maximum 811, the measured result value is stored in temperature memory of maximum 811 instead of the original stored value. The measured result value is converted into decimal data by HEX2BCD hexadecimal estimate converter 812 and through display driver 813 to drive liquid crystal display (LCD) 814 for showing the temperature value. If the measured result value is smaller than the initial value in highest temperature memory 811, a signal is output to make the temperature stability time counter in timing producer 803 increase a unit time, but no signal to HEX2BCD hexadecimal estimate converter 812.

At the same time, the measured result value is stored into buffer memory 817 and a signal is output to make the temperature stability time counter in timing producer 803 turn to zero. Slope calculation buffer memory 819 calculates the difference value between buffer memory 817 and buffer memory 818. The difference value is stored into slope buffer memory 820. Then the value of buffer memory 817 is again stored into buffer memory 818.

Step 908. Estimate interval time between two inflexion points as interval time for sweep later.

At the same time, compare varied values of temperature per unit time. By means of the climbing slope of temperature per unit time turning from decrease to increase, estimate inflexion of temperature climbing to time. (Because heat is brought about by blood flow with the heart pulse, then out by ambient and thermometer, so temperature climbing curve is increasing in form of waves.) The interval time between two inflexion points is the time of a heart pulse.

There are two modes, one of which is that slope comparing buffer memory 822 compares the difference between slope buffer memory 820 and slope buffer memory 821, and the value of slope buffer memory 820 is stored into slope buffer memory 821.

Repeat Step 907, Step 908. If slope turning from decrease to increase is found, the first inflexion point is decided. Start inflexion interval time calculator 823.

Repeat Step 907, Step 908. If slope turning from decrease to increase is again found (After an inflexion point, slope will first increase then decrease, and then increase again), the second inflexion point is decided. A signal is produced to trigger timing producer 803 to change into reciprocal of the time difference between two inflexion points (called as sampling secondary sampling frequency) as sampling frequency. It produces next sampling corresponding control signal output.

The other mode is that slope comparing buffer memory 822 compares the difference between slope buffer memory 820 and slope buffer memory 821, and the value of slope buffer memory 820 is stored into slope buffer memory 821.

Repeat Step 907, Step 908. If slope turning from decrease to increase is found, the first inflexion point is decided. Start inflexion interval time calculator 823.

Repeat Step 907, Step 908. If slope turning from decrease to increase is again found (After an inflexion point, slope will first increase then decrease, and then increase again), the second inflexion point is decided. Repeat for preset n inflexion points.

After performed, a signal is produced to trigger timing producer 803 to change into reciprocal of average of the time difference between n inflexion points (called as sampling secondary sampling frequency) as sampling frequency. It produces next sampling corresponding control signal output.

Step 909. Measure at sampling secondary sampling frequency and display the measured result.

Take the time difference between two inflexion points obtained from the former calculation as interval time for sweep later, so as to make sampling frequency synchronize with heart pulse to reach the same phase for each time sampling. In theory, the time difference is the time difference between the heart pulses.

The sampling time calculator 804 decides sampling time according to preset sampling secondary sampling frequency, through sampling time controller 805, outputs sampling control signal, and controls resistance-frequency converter or an A/D converter (RFC or ADC) 806 to transmit the temperature signal from outside temperature sensor set 807 into digital signal to enter measured value counting buffer memory 808 to be calculated into digital measured result value.

The above measured result value is compared with the initial value already stored in temperature memory of maximum 811 by data comparator 810. If the measured result value is larger than the initial value in temperature memory of maximum 811, the measured result value is stored in temperature memory of maximum 811 instead of the original stored value. The measured result value is converted into decimal data by HEX2BCD hexadecimal estimate converter 812 and through display driver 813 to drive liquid crystal display (LCD) 814 for showing the temperature value. At the same time a signal is output to make the temperature stability time counter in timing producer 803 turn to zero.

If the measured result value is inferior to the initial value in temperature memory of maximum 811, a signal is output to make the temperature stability time counter in timing producer 803 increase a unit time, but no signal to HEX2BCD hexadecimal estimate converter 812.

Step 910. Check for thermal equilibrium.

Check measured temperature during a time, e.g. 4 sec, 8 sec or 16 sec, for continuous rise. If no greater temperature value is measured, it expresses the thermometer with body temperature has tended to thermal equilibrium, and a finish signal is output. If greater temperature value is measured, measure is continued.

When the temperature stability time counter in timing producer 803 reaches an equivalent special time, for example, 4 sec, 8 sec or 16 sec, it expresses there is no greater temperature value during this special time, timing producer 803 will at certain timing sequence trigger sound driver 815.

Step 911. LCD shows and buzzer sounds.

LCD continuously shows the highest measured value, during 4 sec, 8 sec or 16 sec. If no greater temperature value is measured, buzzer will send a series sound to express the measured value has tended to stability.

The liquid crystal display (LCD) 814 continuously shows the highest measured value. Sound driver 815 drives buzzer to send preset sound.

Step 912. Automatic shut.

The liquid crystal display (LCD) continuously shows for a certain time, e.g. 10 minutes, then automatic shut.

Figure 10:
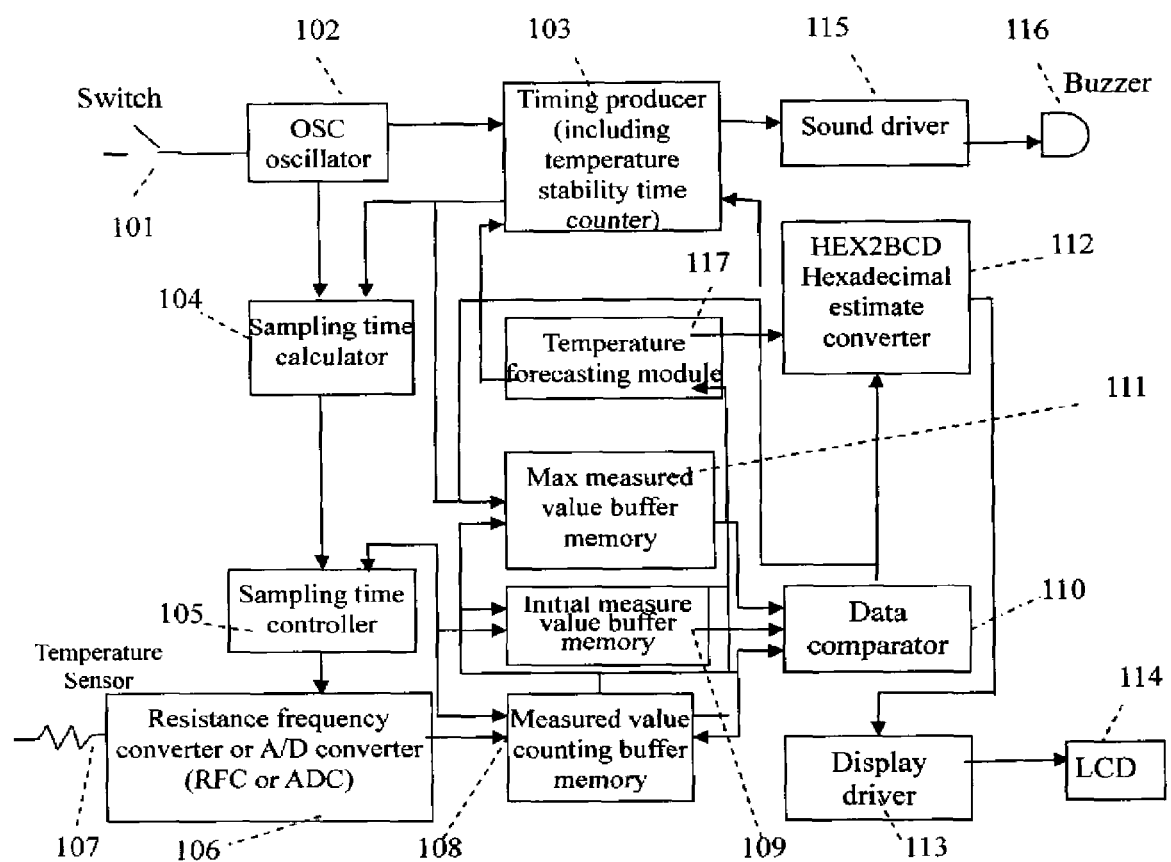
FIG. 10 is an electric circuit structure chart of preferential third embodiment in accordance with the principles of the present invention.
Figure 11:
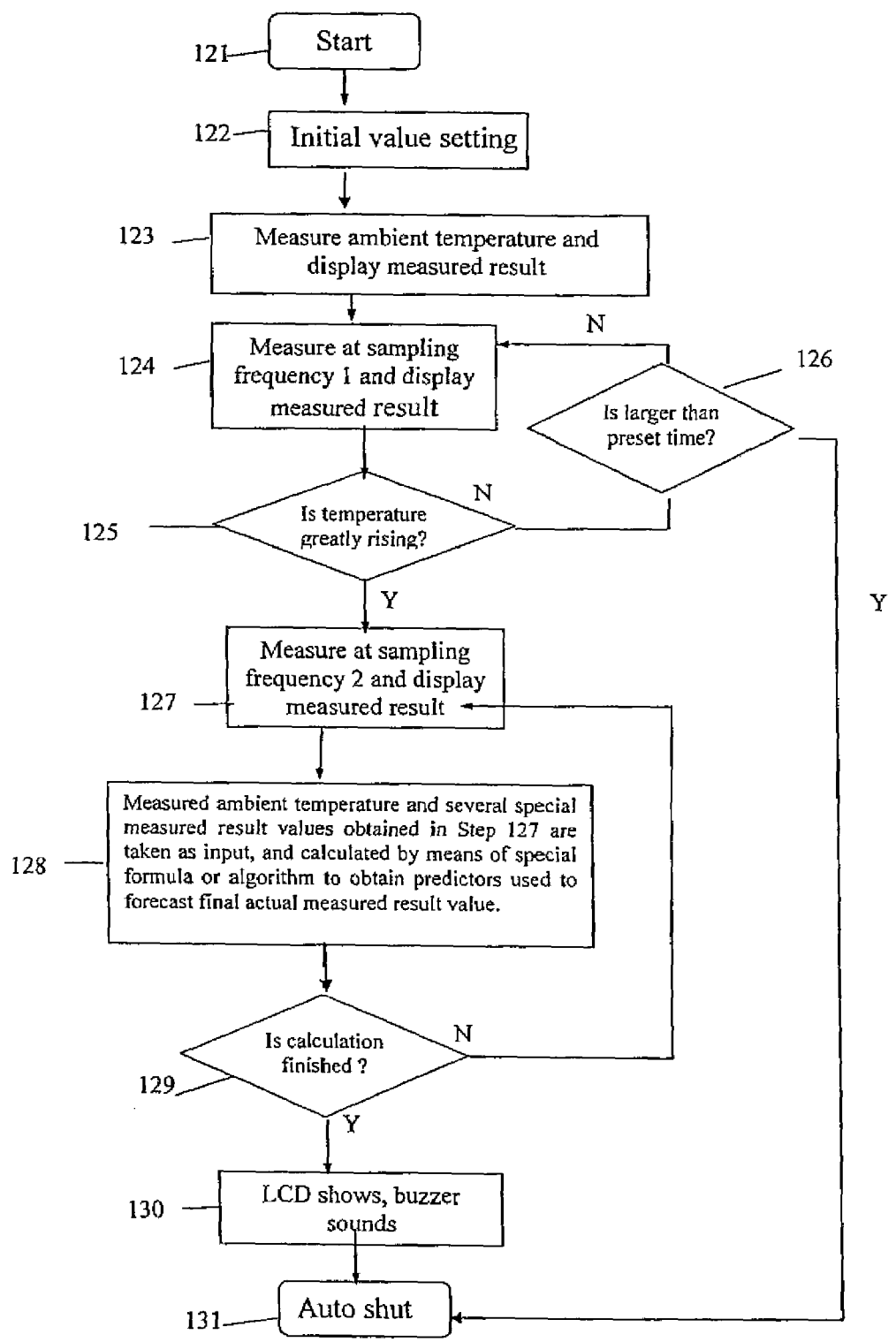
FIG. 11 is a specific functional flow diagram of preferential third embodiment in accordance with the principles of the present invention.

There is the third embodiment in the present invention, as shown in FIG. 10, which is a specific electric circuit structure chart of an electric medical thermometer of preferential third embodiment in accordance with the principles of the present invention. Its operation course, as shown in FIG. 11, is described as follows.

Step 121. Start.

The electric medical thermometer starts running. Start switch 101 of the electric medical thermometer. OSC oscillator 102 produces basic system work frequency to drive the whole electric circuit system.

Step 122. Initial value setting.

First perform initial value setting. Set default values into every controller in the electric circuit.

Step 123. Measure ambient temperature and display measured result.

Perform ambient temperature measure and the measured results are stored in initial value buffer memory and maximum temperature memory, and converted into temperature values to be shown on LCD.

OSC oscillator 102 drives timing producer 103 which produces various preset frequencies and corresponding control signals to output.

The sampling time calculator 104 decides sampling time according to preset sampling frequency, through sampling time controller 105, outputs the first sampling control signal when starting measure, and controls resistance-frequency converter or an A/D converter (RFC or ADC) 106 to transmit the temperature signal from outside temperature sensor set 107 into digital signal to enter measured value counting buffer memory 108 to be calculated into digital measured result value.

The above measured result value is stored in initial value buffer memory 109 and output into temperature forecasting module 117, compared with the initial value already stored in temperature memory of maximum 111 by data comparator 110. If the measured result value is greater than the initial value in temperature memory of maximum 111, the measured result value is stored in temperature memory of maximum 111 instead of the initial value. Because of the measure for the first time, the value must be larger than the initial value, this action must occur.

The measured result value is converted into decimal data by HEX2BCD estimate converter 112, and through display driver 113 to drive liquid crystal display (WCD) 114 for showing the temperature value.

Step 124. Measure at sampling primary sampling frequency and display the measured result.

Perform next temperature measure at sampling primary sampling frequency. If the measured result value is larger than the former maximum value, the measured result value is stored in temperature memory of maximum and converted into temperature value, and shown on LCD.

In this embodiment, perform temperature measure at sampling primary sampling frequency, which is larger than 2 Hz, the better above 10 Hz, so as to accurately master the time point to start measuring body temperature. The timing producer 103 produces next sampling corresponding control signal output.

The sampling time calculator 104 decides sampling time according to preset sampling primary sampling frequency, through sampling time controller 105, outputs sampling control signal, controls resistance-frequency converter or an A/D converter (RFC or ADC) 106 to transmit the temperature signal from outside temperature sensor set 107 into digital signal to enter measured value counting buffer memory 108 to be calculated into digital measured result value.

The above measured result value is compared with the initial value already stored in temperature memory of maximum 111 by data comparator 110. If the measured result value is larger than the initial value in, the measured result value is stored in temperature memory of maximum 111 instead of the original stored value. The measured result value is converted into decimal data by HEX2BCD hexadecimal estimate converter 112, and through display driver 113 to drive liquid crystal display (LCD) 114 for showing the temperature value. At the same time, it outputs signal to make the temperature stability time counter in timing producer 103 turn to zero.

If the measured result value is smaller than the initial value in temperature memory of maximum 111, no follow-up action.

Step 125. Check for greatly rising temperature.

If the measured temperature value is a certain range greater than the first measure result, for example, over 0.2 centigrade Celsius, expressing the thermometer has started measuring body temperature. Skip to Step 127. Otherwise, it expresses measure still in the ambient temperature.

In Step 124, the measured result value is compared with the value in initial measured value buffer memory 109 by data comparator 110, besides compared with the initial value in Maximum measured value buffer memory 111 by data comparator 110. If the measured result value is a special value larger than the value in initial measured value buffer memory 109, for example, it is over 0.2 centigrade Celsius after conversion, a signal is produced to trigger timing producer 103 to change sampling frequency. Otherwise, it outputs signal to make the temperature stability time counter in timing producer 103 increase a unit time.

Step 126. If measured temperature is not rising to a certain range, for example, over 0.2 centigrade Celsius, during a certain time, for example, 3 minutes, automatic shutting down.

If the measured result value is not a special value larger than the value in initial measured value buffer memory 109, for example, it is over 0.2 centigrade Celsius after conversion, a signal is output to make the temperature stability time counter in timing producer 103 increase a unit time. When the temperature stability time counter in timing producer 103 reaches an equivalent special time, for example, 3 minutes, the timing producer 103 produces a signal for automatic shutting down. If the temperature stability time counter in timing producer 103 reaches less than the special time, repeat Step 124 at the same frequency (sampling primary sampling frequency).

Step 127. Measure at sampling secondary sampling frequency and display the measured result.

When measured temperature is a certain range greater than the first measure result, for example, over 0.2 centigrade Celsius, expressing the thermometer has started measuring body temperature. In order to save electric power and obtain the temperature value synchronizing with heart pulse, switch into another sampling frequency. This sampling frequency should approach the heart pulse frequency, e.g. 72 times per minute.

In this embodiment, measuring temperature at sampling secondary sampling frequency of 1.2 Hz, so as to make sampling frequency synchronize with heart pulse to reach the same phase for each time sampling.

If the measured result value is a special value larger than the value in initial measured value buffer memory 109, for example, over 0.2 centigrade Celsius after conversion, a signal is produced to trigger timing producer 103 to change sampling frequency and produces next sampling corresponding control signal output.

The sampling time calculator 104 decides sampling time according to preset sampling secondary sampling frequency, through sampling time controller 105, outputs sampling control signal, and controls resistance-frequency converter or an A/D converter (RFC or ADC) 106 to transmit the temperature signal from outside temperature sensor set 107 into digital signal to enter measured value counting buffer memory 108 to be calculated into digital measured result value.

The above measured result value is output into temperature forecasting module 117 and compared with the initial value already stored in greater temperature memory 111 by data comparator 110. If the measured result value is larger than the initial value in greater temperature memory 111, the measured result value is stored in greater temperature memory 111 instead of the original stored value. The measured result value is converted into decimal data by HEX2BCD hexadecimal estimate converter 112 and through display driver 113 to drive liquid crystal display (LCD) 14 for showing the temperature value. At the same time, a signal is output to make the temperature stability time counter in timing producer 103 turn to zero.

If the measured result value is smaller than the initial value in highest temperature memory 111, a signal is output to make the temperature stability time counter in timing producer 103 increase a unit time, but no signal to HEX2BCD hexadecimal estimate converter 112.

Step 128. Measured temperature and several special measured result values obtained in Step 127 are taken as input, and calculated by means of special formula or algorithm to obtain predictors and to forecast final actual measured result value.

Use pre-written formula or algorithm, take initial temperature value obtained in Step 123 and measured result values obtained in Step 127 as input so as to forecast final result value after measure for a long time and to save measure time.

This embodiment takes calculated input as the temperature value synchronizing with the heart pulse, and reduces interference from blood flow compared with traditional technology, so forecasting will be more accurate.

There is preset formula or algorithm in temperature forecasting module 117, which calculate input values in Step 123 and Step 127 to obtain their calculated values.

Step 129. Has a reasonable predictor been calculated?

Check temperature climbing condition or forecasting result for reasonability by means of preset logic or mode.

There is module used to check predictors for reasonability in temperature forecasting module 117. If reasonable after checking, a signal is output into timing producer 103 which in a special sequence triggers sound driver 115. Enter Step 130.

If input value or forecasting result is not reasonable after checking, repeat Step 127, Step 128.

Step 130. LCD shows and buzzer sounds.

When measured result has finished, buzzer will send a series of sounds. The liquid crystal display (LCD) 114 continuously shows the highest measured value, sound driver 115 drives buzzer to send preset sound.

Step 131. Automatic shut.

The liquid crystal display (LCD) continuously shows for a certain time, e.g. 10 minutes, then automatic shut.

While the present invention have been described with reference to certain preferred embodiments, those of skill in the art will appreciate that the above preferred embodiments are only used to explain the present invention and does not limit the protection scope of the present invention. Various modifications, equivalent replacements, improvements and so on without departing from the spirit and scope of the invention as recited in the claims, are all included in the rights protection scope of the present invention.

I claim:

1. An electric medical thermometer for measuring temperature of patients in cavity, comprising a temperature detecting set for capturing temperature signals and a temperature calculating device for processing the temperature signals, wherein the temperature calculating device translates the temperature signals captured by the temperature detecting set while utilizing a primary sampling frequency and a secondary sampling frequency into a temperature measurement of patients, the primary sampling frequency is greater than the secondary sampling frequency, and the primary sampling frequency is $\geq 2.0$ Hz implementing in between power-on and cavity contact, and the secondary sampling frequency is $^{60}/_{72} \pm 30\%$ seconds per cycle.

2. The electric medical thermometer of claim 1, wherein a means of switching from the primary sampling frequency to the secondary sampling frequency is determined by recognizing an increase of initial temperature signal during a period of the primary sampling frequency.

3. The electric medical thermometer of claim 2, wherein the temperature signals obtained during the period of the secondary sampling frequency or both the temperature signals obtained during the period of the primary sampling frequency and that of the secondary sampling frequency are processed with a specific formula or algorithm to predict a temperature measurement so as to reduce measuring time.

4. The electric medical thermometer of claim 1, wherein the primary sampling frequency is $\geq 2.0$ Hz implementing in between power-on and cavity contact, and the secondary sampling frequency is an estimated value of average heart beat pulse obtained by a calculation.

5. The electric medical thermometer of claim 4, wherein a means of switching from the primary sampling frequency to the secondary sampling frequency is determined by recognizing an increase of initial temperature signal during a period of the primary sampling frequency.

6. The electric medical thermometer of claim 5, wherein the temperature signals obtained during the period of the secondary sampling frequency or both the temperature signals obtained during the period of the primary sampling frequency and that of the secondary sampling frequency are processed with a specific formula or algorithm to predict a temperature measurement so as to reduce measuring time.

7. The electric medical thermometer of claim 4, wherein a means of switching from the primary sampling frequency to the secondary sampling frequency is determined by a calculation of temperature signals obtained from a period of the primary sampling frequency.

8. The electric medical thermometer of claim 7, wherein the temperature signals obtained during the period of the secondary sampling frequency or both the temperature signals obtained during the period of the primary sampling frequency and that of the secondary sampling frequency are processed with a specific formula or algorithm to predict a temperature measurement so as to reduce measuring time.

9. The electric medical thermometer of claim 4, wherein the calculation is based on taking the reciprocal of the timing difference in between a first inflection point and a second inflection point on a function of temperature versus time.

10. The electric medical thermometer of claim 9, wherein a means of switching from the primary sampling frequency to the secondary sampling frequency is determined by a calculation of temperature signals obtained from a period of the primary sampling frequency.

11. The electric medical thermometer of claim 10, wherein the temperature signals obtained during the period of the secondary sampling frequency or both the temperature signals obtained during the period of the primary sampling frequency and that of the secondary sampling frequency are processed with a specific formula or algorithm to predict a temperature measurement so as to reduce measuring time.

12. The electric medical thermometer of claim 4, wherein the calculation is based on taking the reciprocal of the timing difference in between a first inflection point and a $n^{th}$ inflection point divided by n−1 on a function of temperature versus time, where ii is an integer of greater than 1.

13. The electric medical thermometer of claim 12, wherein a means of switching from the primary sampling frequency to the secondary sampling frequency is determined by a calculation of temperature signals obtained from a period of the primary sampling frequency.

14. The electric medical thermometer of claim 13, wherein the temperature signals obtained during the period of the secondary sampling frequency or both the temperature signals obtained during the period of the primary sampling frequency and that of the secondary sampling frequency are processed with a specific formula or algorithm to predict a temperature measurement so as to reduce measuring time.

* * * * *